United States Patent Office 3,809,747
Patented May 7, 1974

3,809,747
SOLUTION FOR TREATMENT OF HAIR
AND SCALP
Catherine M. Toscano, 1657½ E. Santa Clara St.,
San Jose, Calif. 95113
No Drawing. Filed Apr. 20, 1972, Ser. No. 245,939
Int. Cl. A61k 7/06
U.S. Cl. 424—70                2 Claims

ABSTRACT OF THE DISCLOSURE

The treatment of the hair and scalp with an extract of chili peppers.

BACKGROUND OF THE INVENTION

The present invention relates generally to medicinal solutions and more particularly to a solution for treating dandruff, premature loss of hair and other related scalp conditions.

Many scalp treatment solutions, rinses, cleansers and medicines are known in the prior art. However, most of these solutions have in common the use of artificial chemicals which are expensive to manufacture and therefore unduly increase the cost of treating the hair and scalp, and as a result tend to make such treatment an unusual event rather than a usual practice.

SUMMARY OF THE INVENTION

It is therefore a primary object of the present invention to provide a novel solution and method of preparation of such solution for treating the hair and scalp to prevent dandruff, premature loss of hair and related conditions, such solution being simple and easy to prepare and free from harsh synthetic chemicals.

In a preferred embodiment of the present invention, the solution is prepared by boiling an appropriate quantity of chili pepper and lemon in water for a specified period of time. The resultant brothlike solution is then strained to provide a clear liquid solution which may be directly applied to the hair and scalp.

Among the advantages of the present invention are that readily available raw materials are used, the solution does not contain dangerous chemicals, and the solution is inexpensive and easy to prepare.

These and other objects and advantages of the invention will no doubt become apparent to those of skill in the art after having read the following detailed description of the preferred embodiment.

DETAILED DESCRIPTION OF THE PREFERRED
EMBODIMENT

In accordance with the present invention, a clear brothlike liquid is prepared which is suitable for application to the hair and scalp of a user, much in the same way that a rinse is applied. When so applied, the solution is effective to cause dandruff conditions to disappear and tends to give renewed body and strength to the hair so as to reduce brittleness characteristics which allow the hair to break off near the roots or split at the ends.

In preparing the solution, a suitable quantity of hot pepper and a suitable citrus such as lemon is placed in a predetermined quantity of water and the temperature of the water is raised to boiling so as to produce a mixing of the natural oils and juices of the pepper and lemon. The relative quantities of the various materials, of course depends on whether one intends to make a solution of useable strength, or intends to make a concentrated solution which will later be diluted with water before application.

More particularly, the directly useable solution can be prepared by mixing approximately one ounce (by volume) of fresh chili peppers, either whole, sliced, or chopped, with approximately one ounce (by volume) of lemon juice in approximately one quart of water, and then boiling the mixture for as long a time as is needed to insure adequate mixing of the constituent oils and juices. A cooking period of between 10 and 30 minutes has been found quite satisfactory.

Alternatively, the constituency of the solution can be weightwise determined by mixing approximately one ounce of fresh chili pepper or chili pepper extract and approximately one ounce of lemon juice in approximately one pound of water. As in the previous case, this mixture should then be brought to a boil for a short period of time to insure proper interassociation of the constituent oils and juices.

In one exemplary embodiment of the process, from one to five (usually three) medium sized chili papers and the juice from less than one (usually one-half) medium sized lemon were mixed with a gallon of water. The mixture was then brought to a boil and allowed to cook for twenty minutes. At the end of the twenty minute cooking period the solution was poured through a strainer to remove any pepper or lemon pulp so as to leave a clear liquid solution. At this point the basic treatment solution was ready for application to the hair and scalp and could be applied directly without further dilution.

It will be appreciated that the basic solution can be modified by adding suitable perfuming materials thereto so as to provide the solution with a pleasant odor.

Although the nature of the medication provided by the above-described solution is not fully understood at this point, it is suspected that the natural oils and juices of the chili peppers and lemon react favorably with the hair and skin, and tend to supplement the natural body oils which have for one reason or another been lost giving rise to the dandruff and dry hair conditions. Even though chili peppers, either fresh or dried, have been found most suitable, it is contemplated that other hot pepers such as serrano peppers, wax chili peppers, jalapeno peppers and the like could also be used. Similarly, where lemon has been used as an important constituent of the solution, it is contemplated that similar results may be obtained by using limes or other citrus fruits having similar properties.

Whereas a preferred embodiment of my invention has been described above, it is to be understood that certain modifications and additions may be made to the method of preparation as well as to the solution itself without departing from the merits of the invention. Accordingly, it is intended that the appended claims be interpreted as covering all such modifications and/or additions which fall within the true spirit and scope of the invention as defined in the appended claims.

What is claimed is:

1. A solution for use in the treatment of hair and scalp conditions made in accordance with a process comprising:
   disposing from 1 to 5 medium sized chili peppers and from ½ to 1 medium sized lemon in one quart of water;
   boiling the mixture of water, chili pepper and lemon for between 15 and 30 minutes to provide a solution containing the natural oils, juices and pulp of the various constituents; and
   straining the solution to remove the pulp and provide a clear solution.

2. A solution for use in the treatment of hair and scalp conditions made in accordance with a process comprising:
   mixing approximately one ounce by weight of chili pepper extract, approximately one ounce by weight of lemon extract and one pound of water; and boiling the mixture for between 15 and 30 minutes to provide said solution.

References Cited
UNITED STATES PATENTS

| | | | |
|---|---|---|---|
| 451,838 | 5/1891 | Peters | 424—74 |
| 604,111 | 5/1898 | Edwards | 424—74 |
| 1,516,562 | 11/1924 | Calaliro | 424—74 |
| 1,525,299 | 2/1925 | Heitkanp | 424—74 |
| 2,771,395 | 11/1956 | Mehaffey | 424—74 |

STANLEY J. FRIEDMAN, Primary Examiner

U.S. Cl. X.R.

424—74, 195